Patented Aug. 5, 1924.

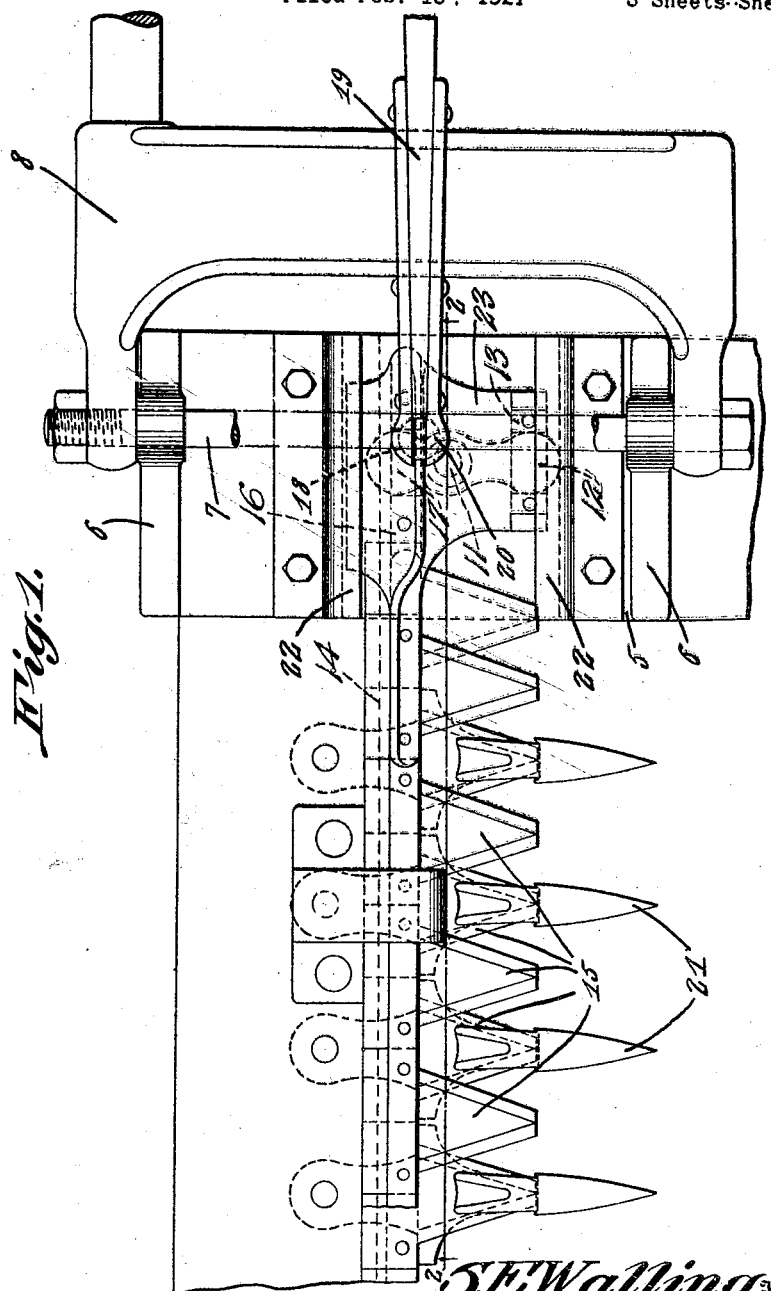

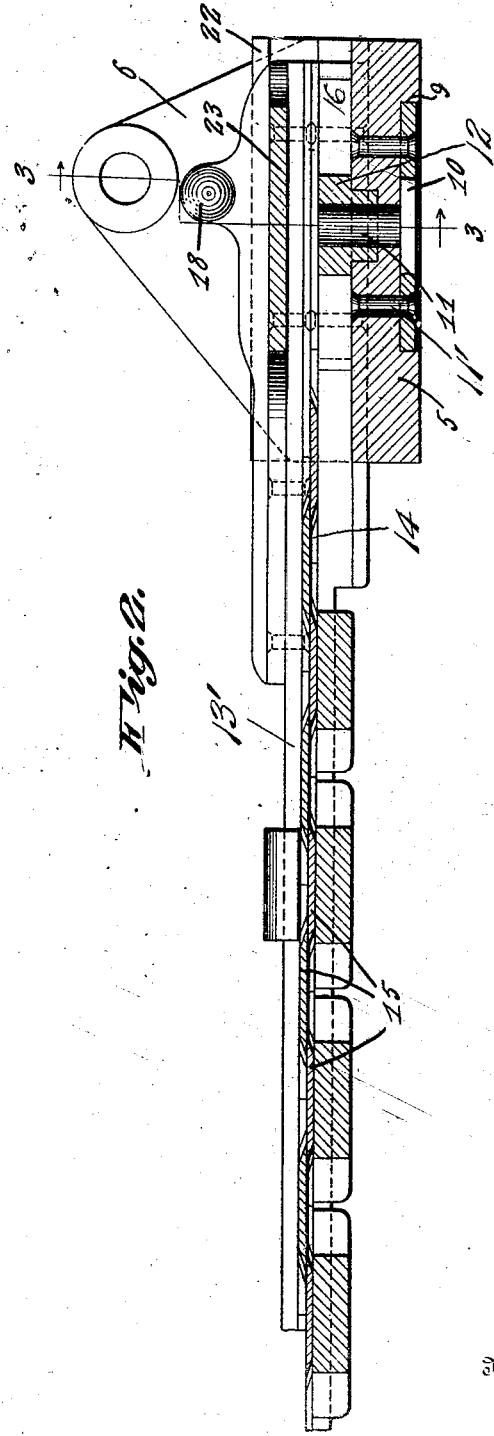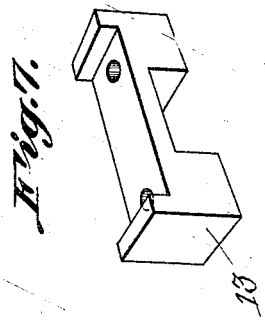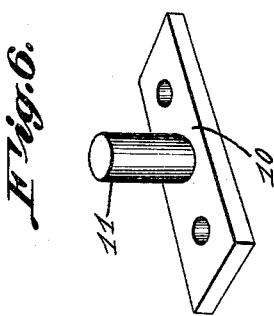

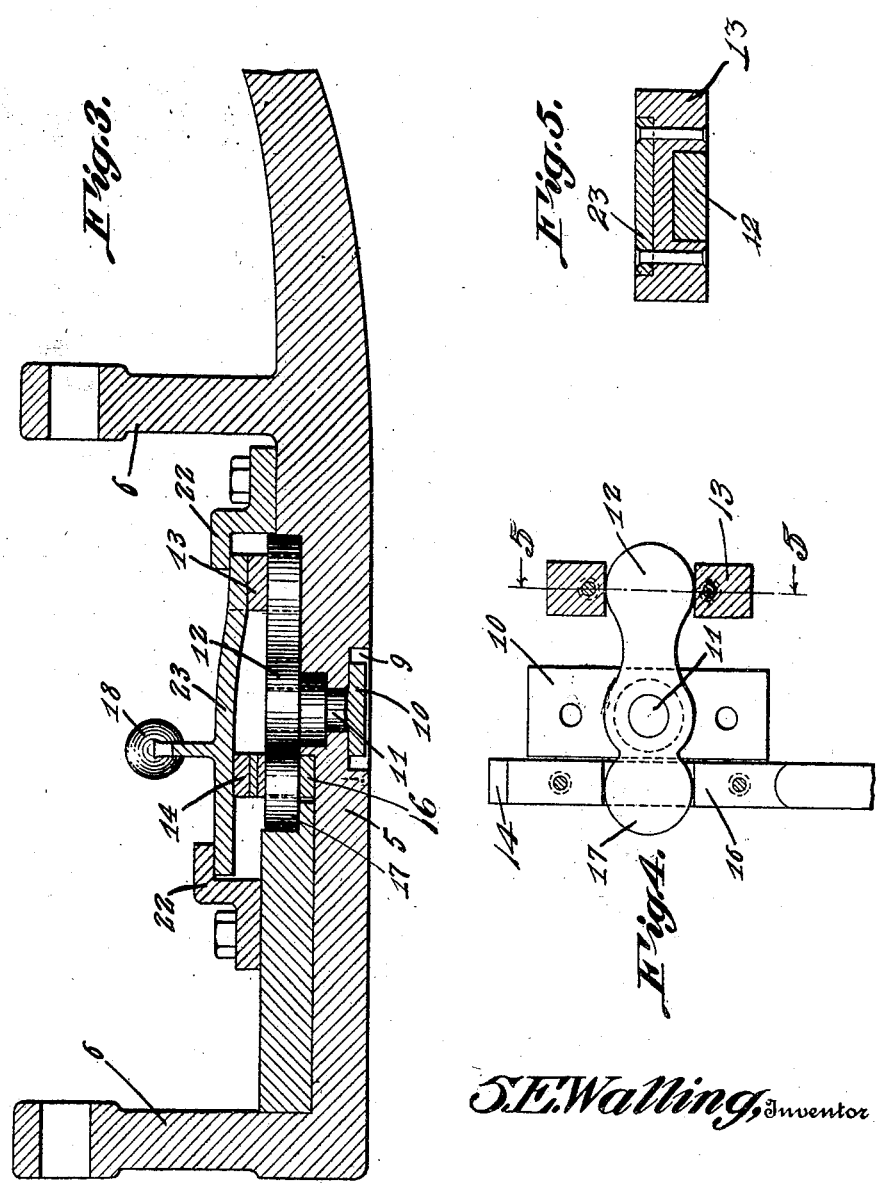

1,503,732

UNITED STATES PATENT OFFICE.

SAMUEL E. WALLING, OF BELLINGHAM, WASHINGTON, ASSIGNOR, BY DIRECT AND MESNE ASSIGNMENTS, TO HARVESTING MACHINERY IMPROVEMENT COMPANY, OF BELLINGHAM, WASHINGTON, A CORPORATION OF WASHINGTON.

HARVESTING MACHINE.

Application filed February 15, 1921. Serial No. 445,141.

*To all whom it may concern:*

Be it known that I, SAMUEL E. WALLING, a citizen of the United States, residing at Bellingham, in the county of Whatcom and State of Washington, have invented a new and useful Harvesting Machine, of which the following is a specification.

This invention relates to improvements in harvesting machines, and more particularly to the cutter bar construction thereof, it being the primary object of the invention to provide novel means for reciprocating the cooperating blades of a cutter bar to insure the operation thereof.

A further object of the invention is to provide a structure of this character which will not interfere with the movement of the cutter bar into and out of operation.

A still further object of the invention is the provision of a novel form of cutter bar which will not increase the weight of the machine nor increase the draft on the animals or machine employed for moving the device supplied with my cutter bar.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a fragmental plan view of a cutter bar constructed in accordance with the present invention.

Figure 2 is a sectional view taken on line 2—2 of Figure 1.

Figure 3 is a sectional view taken on line 3—3 of Figure 1, parts thereof being removed.

Figure 4 is a detail view of the connecting lever that transmits motion to the cutter bars.

Figure 5 is a sectional view through the connecting block and connecting lever, taken on line 5—5 of Fig. 4.

Figure 6 is a perspective view of the pivot pin for the connecting lever; and

Figure 7 is a perspective view of the connecting block.

Referring to the drawings in detail, the reference character 5 designates the base or supporting head of the cutter bar which is provided with upwardly extending arms 6 having openings by means of which the cutter bar may be connected to the frame of a harvester, to permit the cutter bar to be raised and lowered at the will of the operator.

As shown by Figure 1 of the drawings, the arms 6 have connection with the pin 7 that extends through suitable openings in the bracket 8 of the harvester, there being provided means for securing the pins 7 within the bracket 8.

The base 5 is cut away as at 9 to receive the plate 10 which carries the pivot pin 11 that is secured thereto as by means of the rivets 11′, the pivot pin 11 is of a length to extend to a point flush with the upper edge of the base to accommodate the connecting lever 12, which pivots thereon.

The cutting element includes a pair of reciprocating bars 13′ and 14 respectively, each bar carrying a plurality of blades 15 that have beveled edges forming cutting surfaces so that material which falls between adjacent blades will be readily cut by the reciprocating blades.

As shown, the bar 13′ is secured to plate 23 to be hereinafter more fully described. The block 13 is secured to the under side of the plate 23 and has a cut out portion to embrace one of the enlargements forming one end of the connecting lever 12, whereby movement of the bar 13′ produces a pivotal movement of the connecting lever 12, moving one end of the connecting lever in one direction, while the opposite end thereof is moved in the opposite direction.

The cutter bar 14 has connection with the connecting lever 12 as through the block 16 which is cut away to embrace the head 17 formed at one end of the lever 12, so that the head will move within the cut out portion and accomplish the reciprocation of the cutter bar 14.

Bolted to the base 5, are the brackets 22 which provide guides for the plate 23 to which bar 13′ is connected. Thus it will be seen that movement of the plate 23 produces a relative movement of the cutter bars. A ball 18 is formed on the upper surface of the plate 23, and this ball forms one section of the ball and socket joint which connects the plate and the operating arm 19 that has a socket member 20 formed at one end thereof, which socket member grasps the ball 18.

This arm 19 has its opposite end connected to an eccentric, and by means of which reciprocating motion is imparted to the operating arm 19 which in turn imparts reciprocating motion to the cutter bars 13' and 14. It might be further stated that guard fingers 21 are associated with the cutter blades, and through these guard fingers the cutter blades operate, the guard fingers acting to guide the material to the cutting edges of the blades.

In the operation of the device it is obvious that as the arm 19 reciprocates, the cutter bars 13' and 14 are reciprocated in opposite directions, causing the blades carried thereby to also reciprocate in opposite directions to perform the cutting action.

Having thus described the invention, what is claimed as new is:—

In a device of the character described, a base, a pair of opposed cutting bars, a connecting lever pivotally supported on the base, and having heads at its ends, blocks on the cutter bars, said blocks having cut out portions adapted to accommodate the heads of the connecting lever so that movement of one cutter bar results in a movement of the opposed cutter bar in the opposite direction; a connecting link having a socket, and one of said cutter bars having a head to receive the socket of the connecting link.

In testimony that I claim the foregoing as my own, I have hereto affixed my signature in the presence of two witnesses.

SAMUEL E. WALLING.

Witnesses:
 SAM H. PRICE,
 JOHN CONNELL.